Patented Sept. 20, 1932

1,878,970

UNITED STATES PATENT OFFICE

LINDLEY E. MILLS, OF MIDLAND, MICHIGAN, ASSIGNOR TO THE DOW CHEMICAL COMPANY, OF MIDLAND, MICHIGAN, A CORPORATION OF MICHIGAN

PURIFICATION OF PRIMARY AROMATIC AMINE HYDROHALIDES OF THE BENZENE SERIES

No Drawing.  Application filed September 14, 1929. Serial No. 392,727.

The present invention concerns the purification of amine hydrohalides, particularly aniline hydrochloride, and more particularly purification of the latter by methods involving vaporization of such.

Hitherto, amine hydrohalides have usually been purified by, (1) recrystallization from an aqueous or non-aqueous solvent, (2) precipitation from solution by addition of a solvent in which the hydrohalide is comparatively insoluble, but which is miscible with the hydrohalide solvent, or (3) precipitation and conjoint purification of such hydrohalide by passing a gaseous hydrogen halide into a solution of the free amine in a solvent in which the hydrohalide salt is comparatively insoluble.

The above mentioned purification methods involve several operative steps such as concentrations, crystallizations, separations of crystals from liquids, dryings, solvent evaporations and/or recovery and the like. Furthermore, when solvents are used and when several operative steps are employed, there is constantly present a fire hazard, and an industrial poisoning hazard from either solvent or amine or both. Moreover, when an amine hydrohalide, e. g. aniline hydrochloride, is crystallized from aqueous solution, the compound tends to hydrolyze or decompose, i. e. aniline hydrochloride tends to decompose into hydrochloric acid and aniline. The latter is comparatively easily oxidized, especially with the catalytic aid of metal salts which might be present from the action of the acid on dusts, etc. from the air or other source. Said oxidation tends to form a discolored product or one which becomes so on standing a short time. Hence aniline hydrochloride produced industrially by the ordinary aqueous method heretofore employed is usually dark colored and does not dissolve in water to form a clear solution.

I have now found that such amine salts, e. g. amine hydrobromides or hydrochlorides, may be vaporized, sublimed, or distilled, without decomposition in the presence of the corresponding hydrogen halide gas. I have further found that such salts may be distilled in the presence of a gas which produces no appreciable decomposition of such salts, and then condensed in an atmosphere of the corresponding gaseous acid, to yield a pure product. Accordingly, I have devised a new and improved method for the purification of an amine hydrohalide by vaporization and condensation of such salt, at least the latter step being performed in the presence of the corresponding gaseous hydrogen halide, whereby a pure, white, and dry product is obtained directly without the several concentrations, crystallizations, etc., formerly required.

To the accomplishment of the foregoing and related ends the invention, then, consists of the method hereinafter fully described and particularly pointed out in the claims, the following description setting forth in detail several modes of carrying out the invention, such disclosed modes illustrating, however, but several of various ways in which the principle of the invention may be used.

For the purpose of illustration, I shall hereinafter describe the process as adapted to the purification of aniline hydrochloride. Gaseous hydrogen chloride is passed over impure aniline hydrochloride heated at a temperature sufficient to maintain an appreciable vapor pressure of the latter, which temperature may be the melting point of the latter, or either above or below such point. Said gas and product vapors then pass from the heater into a cooling zone wherein the latter is separated from the former, either in the liquid or solid state.

Another mode of procedure is as follows: aniline hydrochloride is distilled or otherwise vaporized, and the product condensed or solidified in an atmosphere of the corresponding hydrogen halide.

One advantage of distilling aniline hydrochloride, for example, in a current of hydrogen chloride, or of condensing the vapors thereof in an atmosphere of hydrogen chloride gas is that, if said hydrochloride has dissociated slightly into its components, i. e. aniline and hydrogen chloride, such free aniline will readily contact and react with the excess of acid gas, and the product condensed will consist of purified amine hydrohalide, free from uncombined aniline. High boiling impurities such as diphenylamine and oxidation derivatives of aniline remain behind as a residue in the still.

For instance, when aniline hydrochloride is heated to about 220° C., dissociation thereof into aniline and hydrogen chloride begins to take place, and at about 245° C., a mixture of aniline hydrochloride with a small amount of free aniline distills, forming substantially a constant boiling mixture of such two constituents. The presence of free aniline in the distilled product causes discoloration thereof, at least on standing for a short time in contact with air and such product may not dissolve in water to form a clear solution. However, if the condensation is carried out in an atmosphere of hydrochloric acid gas, regardless of whether or not such atmosphere is maintained in the distilling vessel, the product consists of a pure aniline hydrochloride substantially uncontaminated by free aniline. The treatment of aniline hydrochloride for the purification thereof may be carried out, then, by introducing hydrogen chloride gas either into the vaporization vessel itself or at some point between the still and cooling chamber or into the latter. The vaporization of other amine salts may be carried out similarly, the temperatures employed, of course, depending upon the specific amine salt to be so treated.

Since aniline hydrochloride, when heated in an atmosphere of gaseous hydrogen chloride to a temperature in the neighborhood of 250° C., begins to decompose with formation of decomposition, condensation, or rearrangement products, such as diphenylamine, etc., it is preferable to control the vaporization of said aniline hydrochloride below such temperature. For other amine hydrohalides the temperature limit may vary somewhat from the above figure depending upon the particular salt employed.

The following detailed examples are given by way of illustration of my improved method, but it is understood that such examples are not to be interpreted as a limitation upon the invention.

Example 1

100 grams of crude, greenish colored aniline hydrochloride was distilled and condensed, both operations being conducted in the presence of hydrogen chloride gas. Before heating, air in the apparatus was displaced by hydrogen chloride and a slow current of the latter was passed into the distilling flask and out through the condenser during the distillation and until the distillate solidified and cooled to approximately room temperature. The yield of pure, white aniline hydrochloride distillate obtained was 98 grams, M. P. 198° C.

Example 2

100 grams of crude, greenish aniline hydrochloride was distilled and condensed, the latter operation being carried out in the presence of gaseous hydrogen chloride. Before heating, the air in the apparatus was displaced by hydrogen chloride and an atmosphere of the latter was maintained in the condenser during the distillation and cooling of the distillate. There was obtained, thereby, 97 grams of pure, white aniline hydrochloride, M. P. 198° C.

Example 3

50 grams of crude ortho-toluidine hydrobromide was vaporized in a current of dry hydrogen bromide gas by passing the latter over the former in a liquid state, the temperature of the former being maintained at 215–225° C. The vapors were carried by said gaseous current into a cooling chamber, wherein white crystals of the salt (M. P. 200° C.) separated. The yield (not including the product carried through the cooling chamber by said gaseous current), was 45 grams.

I do not limit my invention to the materials specifically mentioned in the examples. Other equivalent aliphatic and aromatic amine hydrohalides may be purified in a similar fashion by employing a vaporization temperature below that point at which substantial decomposition or rearrangement thereof occurs. Examples are the hydrohalides of aliphatic or aromatic amines generally.

Other modes of procedure may be employed, and the process may be operated either continuously or in batch, and may be carried out at any preferred pressure. For instance the process may be adapted to continuous operation by adding the hydrohalide, in the liquid or solid state, to the heating zone and withdrawing liquid or solid product from the cooling chamber, excess of hydrogen halide gas being recycled.

The hydrogen halide gas utilized may be diluted with a gas unreactive with the reaction components, i. e. nitrogen.

The gas employed to sweep the vapors of product into the cooling chamber may be either the corresponding hydrogen halide or a gas inert to the other components, such as nitrogen, hydrogen, etc., particularly if the temperature of said vaporization be maintained sufficiently low to avoid substantial dissociation of the product into amine and hydrohalide.

Among the advantages of my present new and improved method for the purification of amine hydrohalides are, (1) pure products may be obtained without resorting to the various crystallizations or precipitation methods with their inherent disadvantages, (2) the product is uncontaminated by free amine, (3) the hydrohalide obtained gives a clear, colorless water solution, (4) the number of operative steps and amount of handling are materially reduced, hence (5) the product can be purified at a lower cost and more satisfactorily than formerly.

In résumé, my invention involves the purification of amine hydrohalides by vaporization and/or condensation thereof in presence of the corresponding gaseous hydrogen halide.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method for purification of a primary aromatic amine hydrohalide of the benzene series, which comprises vaporizing such compound in presence of an excess of the corresponding gaseous hydrogen halide.

2. The method for purification of an aniline hydrohalide, which comprises vaporizing such compound in presence of an excess of the corresponding gaseous hydrogen halide.

3. The method for purification of aniline hydrochloride, which comprises vaporizing such compound in presence of an excess of gaseous hydrogen chloride.

4. The method for purification of aniline hydrochloride, which comprises vaporizing such compound in presence of an excess of gaseous hydrogen chloride and controlling the temperature below that at which material decomposition of the vapor occurs.

5. The method for purifying a primary aromatic amine hydrohalide of the benzene series, which comprises vaporizing such and adding the corresponding gaseous hydrogen halide to the vaporized aromatic amine hydrohalide.

6. The method for purifying an aniline hydrohalide, which comprises vaporizing such and adding the corresponding gaseous hydrogen halide to the vaporized aniline hydrohalide.

7. The method for purifying aniline hydrochloride, which comprises vaporizing such and adding the corresponding gaseous hydrogen chloride to the vaporized aniline hydrochloride.

8. The method for purifying aniline hydrochloride, which comprises vaporizing such and adding the corresponding gaseous hydrogen chloride to the vaporized aniline hydrochloride and controlling the temperature below that at which substantial decomposition of the vapors occurs.

9. In a method of purifying a primary aromatic amine hydrohalide, of the benzene series, the steps which consist in vaporizing said compound, removing the vapors from the vaporizing zone, condensing therefrom the aromatic amine hydrohalide, and introducing the corresponding gaseous hydrogen halide into the vapors, at least during the step of condensing the latter.

10. In a method of purifying an aniline hydrohalide, the steps which consist in vaporizing said compound, removing the vapors from the vaporizing zone, condensing therefrom the aniline hydrohalide, and introducing the corresponding gaseous hydrogen halide into the vapors, at least during the step of condensing the latter.

11. In a method of purifying aniline hydrochloride, the steps which consist in vaporizing said compound, the vapors being maintained at a temperature below about 250° C., removing the vapors from the vaporizing zone, condensing therefrom the aniline hydrochloride, and introducing hydrogen chloride into the vapors, at least during the step of condensing the latter.

12. In a method of purifying a primary aromatic amine hydrohalide of the benzene series through distillation thereof, the step which consists in condensing the vaporized aromatic amine hydrohalide in the presence of an excess of the corresponding gaseous hydrogen halide.

13. In the purification of aniline hydrochloride, the steps which consist of distilling aniline hydrochloride and condensing the distillate, both steps being carried out in the presence of an excess of gaseous hydrogen chloride.

14. In the purification of aniline hydrochloride, the steps which consist of distilling aniline hydrochloride, and condensing the distillate, both steps being carried out in the presence of an excess of gaseous hydrogen chloride, and recycling the hydrogen chloride gas.

15. In the purification of aniline hydrochloride, and recycling the hydrogen chloride the formation of decomposition products thereof by contacting aniline hydrochloride in the vapor phase with excess gaseous hydrogen chloride.

Signed by me this 11th day of September, 1929.

LINDLEY E. MILLS.

CERTIFICATE OF CORRECTION.

Patent No. 1,878,970. September 20, 1932.

LINDLEY E. MILLS.

It is hereby certified that error appears in the printed specification of the above numbered patent requiring correction as follows: Page 3, line 109, claim 15, strike out the words "and recycling the hydrogen chloride" and insert instead "the step which consists of preventing"; and that the said Letters Patent should be read with these corrections therein that the same may conform to the record of the case in the Patent Office.

Signed and sealed this 29th day of November, A. D. 1932.

(Seal)

M. J. Moore,
Acting Commissioner of Patents.